United States Patent

Töpfl

[11] Patent Number: 4,778,919
[45] Date of Patent: Oct. 18, 1988

[54] MALEIC OR PHTHALIC ACID HALF ESTERS OF ALKOXYLATED FATTY AMINES

[75] Inventor: Rosemarie Töpfl, Dornach, Switzerland

[73] Assignee: Ciba-Geigy Corporation, Ardsley, N.Y.

[21] Appl. No.: 15,814

[22] Filed: Feb. 17, 1987

[30] Foreign Application Priority Data

Feb. 25, 1986 [CH] Switzerland ............... 737/86

[51] Int. Cl.$^4$ ............... C07C 69/80; C07C 69/60
[52] U.S. Cl. ........................ 560/85; 8/582; 8/583; 560/88; 560/193; 560/196
[58] Field of Search ............ 560/85, 88, 193, 196; 8/582, 583

[56] References Cited

U.S. PATENT DOCUMENTS

| | | | |
|---|---|---|---|
| 3,529,922 | 9/1970 | Berger et al. | 8/54 |
| 4,313,733 | 2/1982 | Zurbuchen et al. | 8/582 |
| 4,343,620 | 8/1982 | Abel et al. | 8/557 |
| 4,444,563 | 4/1984 | Abel | 8/588 |
| 4,606,916 | 8/1986 | Hofinger et al. | 560/88 X |

FOREIGN PATENT DOCUMENTS 888661  1/1962  United Kingdom .

Primary Examiner—Werren B. Lone
Assistant Examiner—Vera C. Clarke
Attorney, Agent, or Firm—Edward McC. Roberts; Meredith C. Findlay

[57] ABSTRACT

Acid half esters of the formula

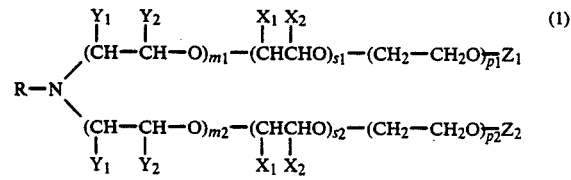

wherein R is an aliphatic radical of 16 to 24 carbon atoms, one of $Y_1$ and $Y_2$ is hydrogen and the other is phenyl, one of $X_1$ and $X_2$ is hydrogen and the other is methyl, one of $Z_1$ and $Z_2$ is hydrogen and the other is the maleic acid radical or the phthalic acid radical, $m_1$ and $m_2$ are each 0 or 1, $s_1$, $s_2$, $p_1$ and $p_2$ are integers, with the sum of $s_1+s_2$ being 5 to 12 and the sum of $p_1+p_2$ is 5 to 30.

These compounds are suitable for a wide range of utilities in textile application. In particular, they are used as assistants for dyeing wool-containing fibre materials with anionic dyes or mixtures of dyes.

7 Claims, No Drawings

MALEIC OR PHTHALIC ACID HALF ESTERS OF ALKOXYLATED FATTY AMINES

The present invention relates to maleic or phthalic acid half esters of alkoxylated fatty amines which are used principally as levelling agents.

Conventional levelling agents for dyeing wool with 1:2 metal complex dyes are normally not effective enough for reactive dyes. On the other hand, the dyeing assistants customarily employed for reactive dyes cause precipitation and/or a draining effect. In addition, both dyeing assistants have the drawback of forming troublesome foam which has to be counteracted by adding antifoams.

It is the object of the present invention to provide levelling agents for dyeing wool or blends of wool and synthetic polyamide, which levelling agents do not cause troublesome foaming and permit simultaneous dyeing with customary wool dyes together with water-soluble reactive dyes.

The acid half esters of this invention are characterized by the formula

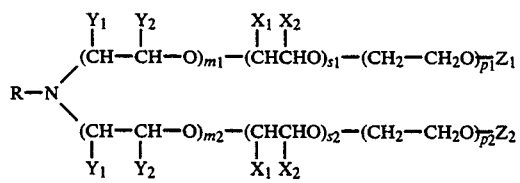

(1)

wherein R is an aliphatic radical of 16 to 24, preferably 18 to 22, carbon atoms, one of $Y_1$ and $Y_2$ is hydrogen and the other is phenyl, one of $X_1$ and $X_2$ is hydrogen and the other is methyl, one of $Z_1$ and $Z_2$ is hydrogen and the other is the maleic acid radical or the phthalic acid radical, $m_1$ and $m_2$ are 0 or 1, $s_1$, $s_2$, $p_1$ and $p_2$ are integers, with the sum of $s_1+s_2$ being 5 to 12, preferably 5 to 10, and the sum of $p_1+p_2$ being 5 to 30, preferably 8 to 25.

The maleic acid half esters are preferred.

In formula (1), R is preferably an alkyl or alkenyl radical of 16 to 24, preferably of 16 to 22, carbon atoms and is most preferably the behenyl radical. These hydrocarbon radicals are attached direct to the amino group, but they can also be attached to the amino group through a —O—CH$_2$-group. Preferably $m_1$ and $m_2$ are both 0 or only one of $m_1$ and $m_2$ is 1. The sum of $s_1+s_2$ is preferably 5 to 10, most preferably 6 to 10, and the sum of $p_1+p_2$ is preferably 8 to 25. The maleic acid radical or phthalic acid radical is attached to the terminal ethoxy group through an ester bridge —CO—O—. The second carboxyl group may be in the free form or in a salt form, e.g. as alkali metal salt, ammonium salt or amine salt.

An alkyl radical R is e.g. palmityl, heptadecyl, stearyl, arachidyl or, preferably, behenyl. An alkenyl radical R may be e.g. dodecenyl, hexadecenyl, octadecenyl (oleyl) or octadecandienyl. R may also be the hydrocarbon radical of palm oil fatty acids or tallow fatty acids.

The acid esters of the present invention can be obtained by methods which are known per se by esterification at an end group of the formula

—CH$_2$—CH$_2$—OH of an alkoxylated fatty amine as defined herein with a functional derivative of maleic acid or phthalic acid, e.g. maleic anhydride or phthalic anhydride. In addition, small amounts of the unesterified and/or diesterified alkoxylated fatty amines may be present in the final product. Esterification is conveniently effected by simple mixing of the reactants, preferably in the temperature range from 50° to 100° C.

The alkoxylated fatty amines are prepared by reacting the aliphatic amines containing preferably 16 to 24 carbon atoms in the alkyl or alkenyl moieties alternately with 5 to 12 moles of propylene oxide and 5 to 30 moles of ethylene oxide or with 1 to 2 moles of styrene oxide, 5 to 12 moles of propylene oxide and 5 to 30 moles of ethylene oxide.

The aliphatic amines required as starting materials for the preparation of the acid half esters of formula (1) may contain saturated or unsaturated, branched or unbranched hydrocarbon radicals. The amines can be chemically homogeneous or in the form of mixtures. Preferred amine mixtures are those obtained by converting natural fats or oils, e.g. tallow fatty oil, soybean oil or palm oil, into the corresponding amines. Representative amines are: hexadecylamine, heptadecylamine, octadecylamine, tallow fatty amine, arachidylamine, behenylamine, lignocerylamine, octadecenylamine (oleylamine) and erucylamine as well as mixtures of these amines, e.g. mixtures of behenylamine and arachidylamine.

Preferred acid half esters are those of formula

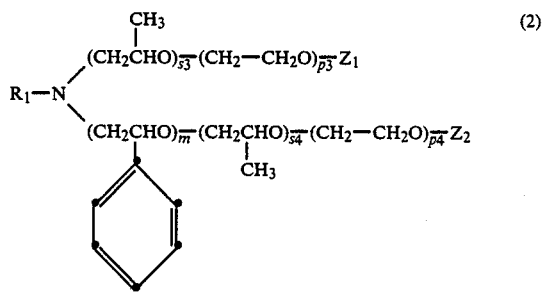

(2)

wherein
$R_1$ is alkyl or alkenyl, each of 16 to 24 carbon atoms, preferably behenyl, one of
$Z_1$ and $Z_2$ is hydrogen and the other is the maleic acid radical or the phthalic acid radical,
m is 0 or 1 and $s_3$, $s_4$, $p_3$ and $p_4$ are integers, with the sum of $s_3+s_4$ being 5 to 10 and the sum of $p_3+p_4$ being 8 to 25. m is preferably 0.

Among the acid half esters of formula (2), the maleic acid half esters are preferred.

The novel half esters are suitable for a wide variety of utilities in textile application. In particular they are used as assistants for dyeing wool-containing fibre materials with anionic dyes or mixtures of dyes.

Accordingly, the present invention also relates to a process for dyeing wool-containing fibre material with anionic dyes, which comprises treating said material, before or during dyeing, with a formulation that contains an acid half ester of formula (1) and, in particular, the compounds of formula (2).

The amounts in which the acid half esters of formula (1) or (2) are added to the dye baths are preferably from 0.1 to 5% by weight, preferably 0.2 to 3% by weight, based on the wool material to be dyed.

Suitable wool-containing material is wool itself or wool/polyester blends or, preferably, wool/polyamide blends. Synthetic polyamide may be that obtained from adipic acid and hexamethylenediamine (polyamide 6,6), from ε-caprolactam (polyamide 6), from ω-aminoundecanoic acid (polyamine 11), from ω-aminoenanthic acid (polyamide 7), from ω-aminopelargonic acid (polyamide 8) or from sebacic acid and hexamethylenediamine (polyamide 6,10).

The fibre material may be in a very wide range of presentation, for example as flocks, slubbing, wovens, knits, nonwovens, yarn or piece goods.

The anionic dyes employed in the process of this invention may be for example salts of heavy metal-containing or metal-free monoazo, disazo or polyazo dyes, including formazan dyes, as well as of anthraquinone, xanthene, nitro, triphenylmethane, naphthoquinoneimine and phthalocyanine dyes. The anionic character of these dyes can be determined by metal complexing alone and/or preferably by acid salt-forming substituents such as carboxylic acid groups, sulfuric acid groups and phosphonate groups, phosphonic acid groups or sulfonic acid groups. These dyes may also contain reactive groups in the molecule, which groups are able to form a covalent bond with the material to be dyed. Acid metal-free reactive dyes which preferably contain two sulfonic acid groups are preferred.

Of particular interest are also the 1:1 metal complex dyes or, preferably, 1:2 metal complex dyes. The 1:1 metal complex dyes preferably contain one or two sulfonic acid groups. As metal they contain a heavy metal atom, for example a copper, nickel or, preferably, chromium atom. The 1:2 metal complexes contain as central metal atom a heavy metal atom, for example a cobalt atom or, preferably, a chromium atom. Two complexing components are attached to the central metal atom, at least one of which components is a dye molecule; but preferably both components are dye molecules. Further, the two complexing dye molecules may be identical or different. The 1:2 metal complex dyes may contain e.g. two azomethine molecules, one disazo dye molecule and one monoazo dye molecule or, preferably, two monoazo dye molecules. The azo dye molecules may contain water solubilising groups, e.g. acid amide groups, alkylsulfonyl groups or the acid groups mentioned above. Preferred 1:2 metal complex dyes are 1:2 cobalt or 1:2 chromium complexes of monoazo dyes, which complexes contain acid amide groups, alkylsulfonyl groups or a single sulfonic acid group. Particularly preferred 1:2 metal complex dyes are 1:2 chromium mixed complexes of azo dyes, which complexes contain one sulfonic acid group.

It is also possible to use mixtures of anionic dyes. For example, mixtures of at least 2 or 3 anionic dyes can be used for obtaining level bichromatic or trichromatic dyeings. It is particularly preferred to use dye mixtures comprising a reactive dye that contains at least two sulfonic acid groups and a 1:2 metal complex dye. The mixture ratio may vary from 9:1 to 1:9.

The amount of dye added to the dyebath depends on the desired depth of shade. In general, amounts of 0.1 to 10% by weight, preferably of 0.1 to 5% by weight, based on the fibre material, have proved suitable.

The dyebaths may contain mineral acids such as sulfuric acid or phosphoric acid, organic acids, preferably lower aliphatic carboxylic acids such as formic acid, acetic acid or oxalic acid, and/or salts such as ammonium acetate, ammonium sulfate or sodium acetate. The acids are added in particular to adjust the pH of the dyebaths, which is normally in the range from 4 to 7, preferably from 5 to 6. If it is desired to effect treatment with the acid half ester before dyeing, it is best to add the acid or the buffer mixture to the pretreatment liquor.

When using reactive dyes, a fixation alkali such as aqueous ammonia, an alkali metal hydroxide or alkali metal carbonate or bicarbonate will usually be added subsequently to the dyebath. The pH of the alkali-containing dyebath is normally in the range from 7.5 to 9, preferably from 8 to 8.5.

The dyebaths may contain further conventional assistants such as electrolytes, protective agents for wool, dispersants and wetting agents. Antifoams, e.g. silicone oils, are not required.

Preferably the dyebaths or pretreatment liquors will contain hydrotropic agents in addition to the amphoteric maleic acid or phthalic acid half esters. The assistants are preferably non-ionic surfactants which are adducts of 30 to 200 moles, preferably 30 to 100 moles, of ethylene oxide and 1 mole of an alkylphenol containing 4 to 12 carbon atoms in the alkyl moiety or preferably of an aliphatic monoalcohol of 12 to 22 carbon atoms. Such surfactants are typically the adduct of 80 moles of ethylene oxide and 1 mole of oleyl alcohol, the adduct of 35 moles of ethylene oxide and 1 mole of nonylphenol, the adduct of 200 moles of ethylene oxide and 1 mole of dihydroabietyl alcohol, or the adduct of 35 moles of ethylene oxide and 1 mole of soybean oil. The weight ratio of the acid half ester to these adducts is advantageously from 2:1 or 1:1 to 1:4, preferably from 1:1 to 1:2.

Dyeing is conveniently carried out from an aqueous liquor by the exhaust process. The liquor to goods ratio may accordingly be chosen within a wide range, e.g. from 1:3 to 1:100, preferably from 1:10 to 1:50. The dyeing temperature is conveniently in the range from 60° to 125° C., preferably from 80° to 98° C. The dyeing time may vary depending on the requirements, but is normally from 30 to 120 minutes.

Special apparatus is not required for carrying out the process of this invention. Conventional dyeing apparatus such as open baths, jiggers, paddle or jet dyeing machines, circulation dyeing machines or winchbecks, may be employed.

Dyeing is conveniently carried out by treating the goods to be dyed with an aqueous liquor that contains acid and the acid half ester, preferably the maleic acid half ester and then, after addition of the dye, dyeing the treated goods in the same bath. The wool-containing material is preferably put into a liquor that contains acid, the maleic half ester and the dye or dye mixture, and which has a temperature of 40° to 60° C. The temperature is then slowly raised to carry out dyeing in the indicated temperature range over the course of 15 to 90 minutes, preferably 30 to 60 minutes. When using reactive dyes, the goods to be dyed are treated with alkali for 10 to 20 minutes in the temperature range from 70° to 90° C. Finally, the dyed material is removed from the bath and rinsed and dried in conventional manner.

The presence of the maleic acid or phthalic acid half ester causes not troublesome foaming during the dyeing process.

The dyeing process of this invention affords level, strong dyeings which are also distinguished by good rubfastness and good dye yield. In addition, the other fastness properties, such as lightfastness and wetfastness, are not adversely affected by the use of the novel acid half ester by itself or in combination with hydrotropic agents. Further, complete exhaustion of the dyebath is attained without any dye precipitation. In addition, it is not always necessary to rinse the material before drying it.

The invention is illustrated by the following Examples, in which parts and percentages are by weight.

PREPARATORY EXAMPLES

Example 1

29.6 g of phthalic anhydride and 0.23 g of tributylamine are added to 219.6 g of an adduct of 1 mole of behenylamine, 6 moles of propylene oxide and 10 moles of ethylene oxide and the mixture is stirred for 6 hours at 100° C. The acid number (=48) is then determined and the product is diluted with 249 g of water, affording 498 g of a brown viscous solution containing 50% of the phthalic acid half ester of formula

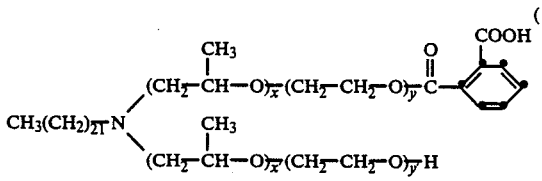

wherein $x+x'=6$ and $y+y'=10$. The product is miscible in all proportions with water. The pH is 5.7.

Example 2

19.6 g of maleic anhydride and 0.1 g of tributylamine are added to 219.6 g of an adduct of 1 mole of behenylamine, 6 moles of propylene oxide and 10 moles of ethylene oxide and the mixture is stirred for 6 hours at 100° C. The acid number (=47) is then determined and the product is diluted with 239 g of water, affording 478 g of a light brown viscous solution containing 50% of the maleic acid half ester of formula

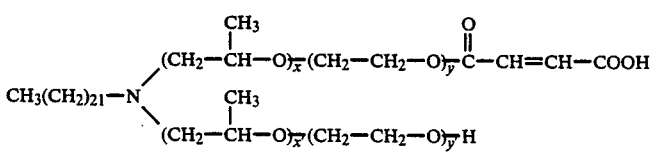

wherein $x+x'=6$ and $y+y'=10$. The product is miscible in all proportions with water. The pH is 5.7.

Example 3

14.8 g of phthalic anhydride and 0.14 g of tributylamine are added to 153.9 g of an adduct of 1 mole of behenylamine, 6 moles of propylene oxide and 20 moles of ethylene oxide and the mixture is stirred for 6 hours at 100° C. The acid number (=35) is then determined and the product is diluted with 168 g of water, affording 336 g of a brown viscous solution containing 50% of the phthalic acid half ester of formula

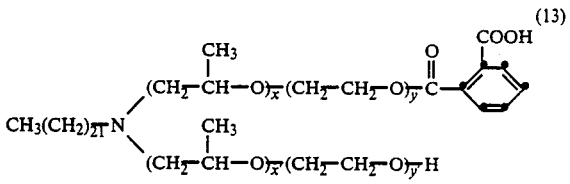

wherein $x+x'=6$ and $y+y'=20$. The product is miscible in all proportions with water. The pH is 5.6.

Example 4

14.7 g of maleic anhydride and 0.1 g of tributylamine are added to 198 g of an adduct of 1 mole of behenylamine, 6 moles of propylene oxide and 15 moles of ethylene oxide and the mixture is stirred for 6 hours at 100° C. The acid number (=41) is then determined and the product is diluted with 212 g of water, affording 424 g of a brown viscous solution containing 50% of the maleic acid half ester of formula

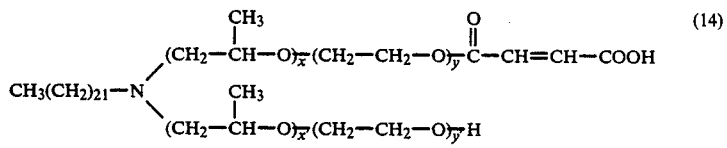

wherein $x+x'=6$ and $y+y'=15$. The product is miscible in all proportions with water. The pH is 5.3.

Example 5

22.2 g of phthalic anhydride and 0.2 g of tributylamine are added to 198 g of an adduct of 1 mole of behenylamine, 6 moles of propylene oxide and 15 moles of ethylene oxide and the mixture is stirred for 6 hours at 100° C. The acid number (=41) is then determined and the product is diluted with 220 g of water, affording 440 g of a brown viscous solution containing 50% of the phthalic acid half ester of formula

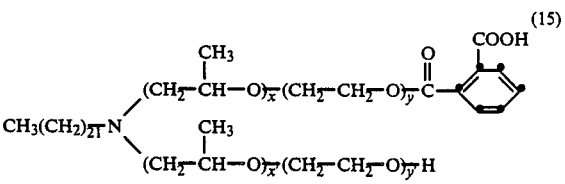

wherein $x+x'=6$ and $y+y'=15$. The product is miscible in all proportions with water. The pH is 5.1.

Example 6

14.7 g of maleic anhydride and 0.1 g of tributylamine are added to 248 g of an adduct of 1 mole of behenylamine, 8 moles of propylene oxide and 20 moles of ethylene oxide and the mixture is stirred for 6 hours at 100° C. The acid number (=34) is then determined and the product is diluted with 262 g of water, affording 524 g of a light brown viscous solution containing 50% of the maleic acid half ester of formula

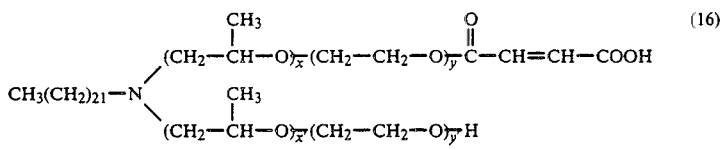
(16)

wherein x+x'=8 and y+y'=20. The product of miscible in all proportions with water. The pH is 6.0.

Example 7

19.2 g of phthalic anhydride and 0.23 g of tributylamine are added to 215 g of an adduct 1 mole of behenylamine, 8 moles of propylene oxide and 20 moles of ethylene oxide and the mixture is stirred for 6 hours at 100° C. The acid number (=35) is then determined and the product is diluted with 234 g of water, affording 468 g of a brown viscous solution containing 50% of the phthalic acid half ester of formula

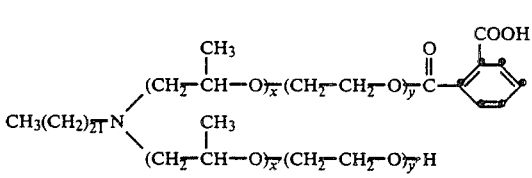
(17)

wherein x+x'=8 and y+y'=20. The product is miscible in all proportions with water. The pH is 6.0.

Example 8

9.8 g of maleic anhydride and 0.1 g of tributylamine are added to 155.5 g of an adduct of a mixture of fatty amines (consisting of 30% of palmitylamine, 30% of stearylamine and 40% of oleylamine), 7 moles of propylene oxide and 20 moles of ethylene oxide and the mixture is stirred for 6 hours at 100° C. The acid number (=32) is then determined and the product is diluted with 165 g of water, affording 330 g of a light brown, slightly viscous solution containing 50% of the maleic acid half ester of formula

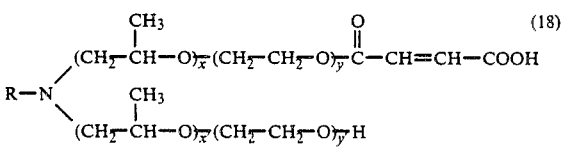
(18)

R=30% palmityl, 30% stearyl, 40% oleyl wherein x+x'=7 and y+y'=20. The product is miscible in all proportions with water. The pH is 5.6.

Example 9

7.4 g of maleic anhydride and 0.06 g of tributylamine are added to 120.6 g of an adduct of 1 mole of behenylamine, 1 mole of styrene oxide, 5 moles of propylene oxide and 20 moles of ethylene oxide and the mixture is stirred for 6 hours at 100° C. The acid number (=33) is then determined and the product is diluted with 127.5 g of water, affording 254 g of a brown viscous solution containing 50% of the maleic acid half ester of formula

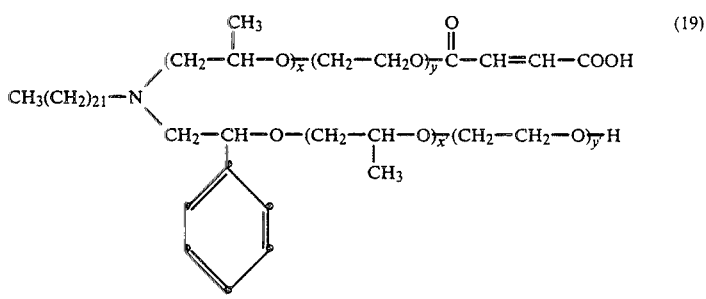
(19)

wherein x+x'=5 and y+y'=20. The product is miscible in all proportions with water. The pH is 5.4.

Example 10

4.9 g of maleic anhydride and 0.05 g of tributylamine are added to 120.4 g of an adduct of 1 mole of a mixture of fatty amines (consisting of 30% of palmitylamine, 30% of stearylamine and 40% of oleylamine), 1 mole of styrene oxide, 12 moles of propylene oxide and 30 moles of ethylene oxide and the mixture is stirred for 6 hours at 100° C. The acid number (=23) is then determined and the product is diluted with 125 g of water, affording 250 g of a light brown, slightly viscous solution containing 50% of the maleic acid half ester of formula

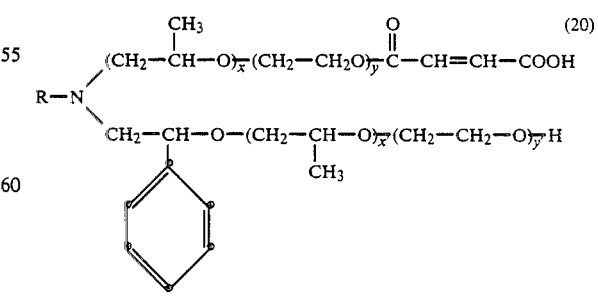
(20)

R=30% palmityl, 30% stearyl, 40% oleyl wherein x+x'=12 and y+y'=30. The product is miscible in all proportions with water. The pH is 5.9.

Example 11

11.1 g of phthalic anhydride and 0.13 g of tributylamine are added to 120 g of an adduct of 1 mole of behenylamine, 1 mole of styrene oxide, 5 moles of propylene oxide and 20 moles of ethylene oxide and the mixture is stirred for 6 hours at 100° C. The acid number (=30) is then determined and the product is diluted with 131 g of water, affording 262 g of a light brown viscous solution containing 50% of the phthalic acid half ester of formula

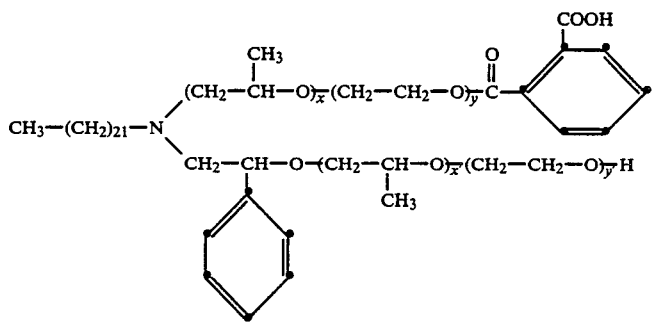
(21)

wherein $x+x'=5$ and $y+y'=20$. The product is miscible in all proportions with water. The pH is 5.6.

Example 12

7.4 g of phthalic anhydride and 0.13 g of tributylamine are added to 120.4 g of an adduct of 1 mole of a mixture of fatty amines (consisting of 30% of palmitylamine, 30% of stearylamine and 40% of oleylamine), 1 mole of styrene oxide, 12 moles of propylene oxide and 30 moles of ethylene oxide and the mixture is stirred for 6 hours at 100° C. The acid number (=22) is then determined and the product is diluted with 127 g of water, affording 254 g of a brown viscous solution containing 50% of the phthalic acid half ester of formula

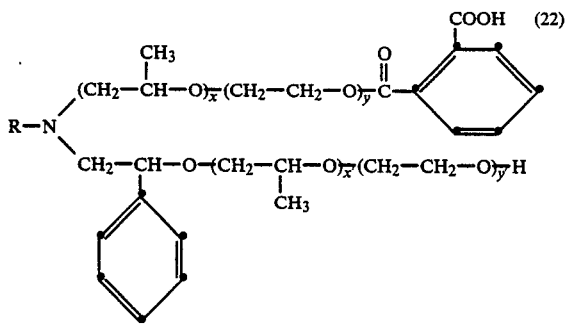
(22)

R=30% palmityl, 30% stearyl, 40% oleyl wherein $x+x'=12$ and $y+y'=30$. The product is miscible in all proportions with water. The pH is 5.9.

APPLICATION EXAMPLES

Example 1

100 g of woollen fabric are wetted in a winchbeck with a liquor containing in 4000 liters of water of 40° C.
 4 kg of ammonium sulfate
 2 kg of 80% acetic acid
 1.5 kg of an aqueous formulation containing 25% of the maleic acid half ester of formula (12) obtained in Example 2 and 37.5% of the adduct of 80 moles of ethylene oxide and 1 mole of oleyl alcohol.

Then an aqueous solution of 3 kg of the dye of formula

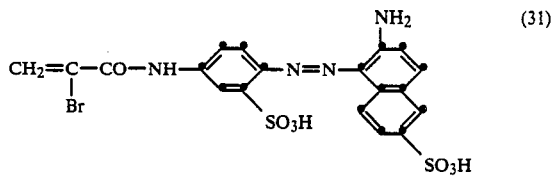
(31)

is added. The dye liquor is subsequently heated to boiling temperature over 30 minutes and the goods are kept for 60 minutes at this temperature.

No troublesome foaming occurs during the entire dyeing process. The dyebath is then cooled to 80° C. and the pH is adjusted to 8.5 with ammonia water. After a treatment time of 15 minutes at 80° C., the goods are rinsed and dried, affording a level, red, speck-free dyeing.

Example 2

100 kg of wool hank yarn are wetted in a circulation dyeing machine at 40° C. with a liquor containing in 1000 liters of water
 1 kg of sodium acetate
 3 kg of 80% acetic acid
 5 kg of sodium sulfate
 1 kg of an aqueous formulation which contains 25% of the phthalic acid half ester of formula (11) obtained in Example 1 and 37.5% of the adduct of 80 moles of ethylene oxide and 1 mole of oleyl alcohol.

Then 3 kg of a mixture of a dye of formula

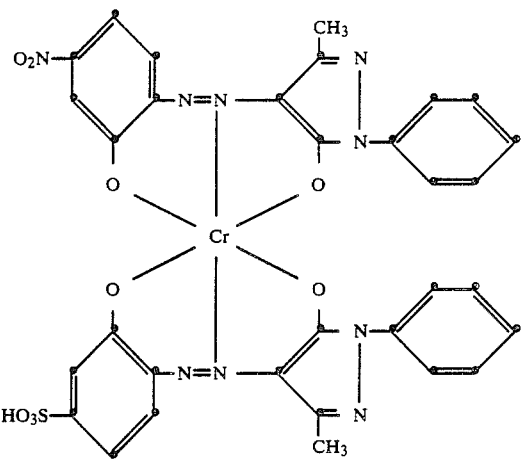

and a 1:2 cobalt complex of the dye of formula

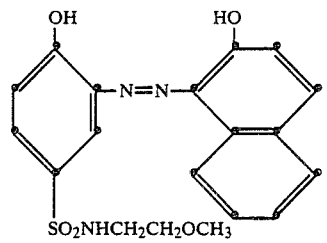

in the ratio 7:1 are added.

The dyebath is then heated to boiling temperature over 45 minutes and the goods are kept for 60 minutes at this temperature. No troublesome foaming occurs during the entire dyeing process. The goods are then rinsed and dried. The wool yarn is dyed in a fast, level, claret shade.

Example 3

100 kg of woollen serge are wetted in a winchbeck in 5000 liters of water of 40° C. The following ingredients are then added:

4 kg of ammonium sulfate 3 kg of 80% acetic acid 1.5 kg of an aqueous formulation which contains 25% of the maleic acid half ester of formula (12) obtained in Example 2 and 37.5% of the adduct of 80 moles of ethylene oxide and 1 mole of oleyl alcohol, 3 kg of the dye of formula (31) and 1 kg of the dye mixture of Example 2 consisting of the 1:2 chromium mixed complex dye of formula (32) and the 1:2 cobalt complex of the dye of formula (33).

The dyebath is then heated to boiling temperature over 30 minutes and the goods are kept for 60 minutes at this temperature. No troublesome foaming occurs during the entire dyeing process. The dyebath is then cooled to 80° C. and the pH is adjusted to 8.5 with ammonia water. After a treatment time of 15 minutes at 80° C., the goods are rinsed and dried, affording a level, rubfast dyeing. The bath exhaustion is excellent.

Example 4

100 g of woollen fabric are dyed in a winchbeck with a dye liquor containing in 4000 liters of water 4 kg of sulfuric acid 10 kg of sodium sulfate 3 kg of an aqueous formulation which contains 20% of the maleic acid half ester of formula (12) obtained in Example 2 and 40.0% of the adduct of 35 moles of ethylene oxide and 1 mole of nonylphenol, 2 kg of the dye, Acid Blue 158, C.I. 14880.

Dyeing is commenced at 70° C. and the liquor is circulated for 10 minutes at this temperature. The bath is then heated to the boil over 30 minutes and kept for 90 minutes at boiling temperature. No troublesome foaming occurs during the dyeing process. The bath is then cooled and the goods are rinsed and dried. The wool is dyed in a level blue shade.

Example 5

100 kg of wool yarn are wetted in a hank dyeing machine in 1500 liters of water of 40° C. The following ingredients are then added to the bath:

0.5 kg of 80% acetic acid 10 kg of sodium sulfate and 1 kg of an aqueous formulation which contains 35% of the acid half ester of formula (11) obtained in Example 1 and 30% of the adduct of 35 moles of ethylene oxide and 1 mole of soybean oil.

The liquor is then circulated for 15 minutes and 1 kg of the dye of the formula

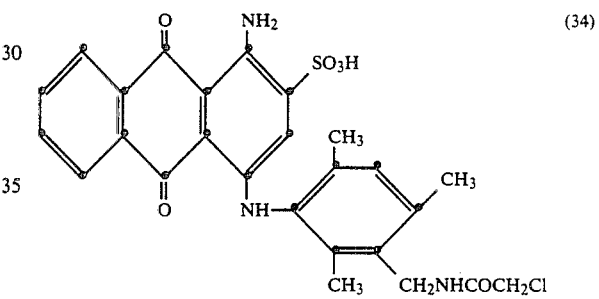

is added. The dye liquor is then heated to the boil over 30 minutes and dyeing is carried out for 30 minutes at this temperature. No troublesome foaming occurs during the entire dyeing process. The goods are finally rinsed and dried. The wool is dyed in a fast, level, brilliant blue shade.

Comparable results are obtained by replacing in Application Examples 1, 2, 3, 4 and 5 the acid half ester of formula (11) or (12) by the same amount of one of the acid half esters of formulae (13) to (22) obtained in Preparatory Examples 3 to 12.

What is claimed is:

1. A maleic acid or phthalic acid half ester of formula

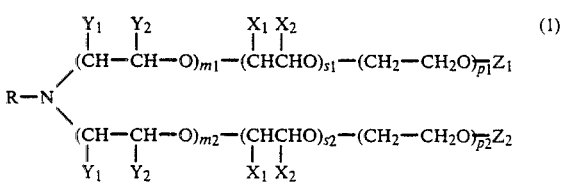

wherein

R is an aliphatic radical of 16 to 24 carbon atoms, one of $Y_1$ and $Y_2$ is hydrogen and the other is phenyl, one of $X_1$ and $X_2$ is hydrogen and the other is methyl, one of $Z_1$ and $Z_2$ is hydrogen and the other is the maleic acid radical or the phthalic acid radical, $m_1$ and $m_2$ are each 0 or 1, $s_1$, $s_2$, $p_1$ and $p_2$ are integers, with the sum of $s_1+s_2$ being 5 to 12 and the sum of $p_1+p_2$ being 5 to 30.

2. An acid half ester according to claim 1, wherein R is an alkyl or alkenyl radical, each of 16 to 24 carbon atoms.

3. An acid half ester according to claim 2, wherein R is behenyl.

4. An acid half ester according to claim 1, wherein $m_1$ and $m_2$ are 0 or only one of $m_1$ and $m_2$ is 1.

5. An acid half ester according to claim 1, wherein the sum of $s_1+s_2$ is 5 to 10.

6. An acid half ester according to claim 1, wherein the sum of $p_1+p_2$ is 8 to 25.

7. An acid half ester according to claim 1 of formula

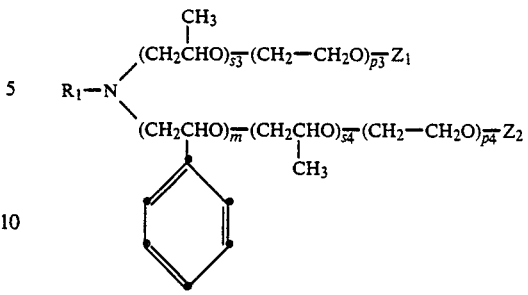

(2)

wherein $R_1$ is alkyl or alkenyl, each of 16 to 24 carbon atoms, one of $Z_1$ and $Z_2$ is hydrogen and the other is the maleic acid radical or the phthalic acid radical, m is 0 or 1 and $s_3$, $s_4$, $p_3$ and $p_4$ are integers, with the sum of $s_3+s_4$ being 5 to 10 and the sum of $p_3+p_4$ being 8 to 25.

* * * * *